US012211407B2

(12) United States Patent
Meng et al.

(10) Patent No.: US 12,211,407 B2
(45) Date of Patent: Jan. 28, 2025

(54) DISPLAY PANEL, METHOD FOR COMPENSATING FOR AGING OF DISPLAY PANEL AND DISPLAY DEVICE

(71) Applicants: Hefei BOE Joint Technology Co., Ltd., Anhui (CN); BOE Technology Group Co., Ltd., Beijing (CN)

(72) Inventors: Song Meng, Beijing (CN); Min He, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/033,382

(22) PCT Filed: Apr. 29, 2022

(86) PCT No.: PCT/CN2022/090134

§ 371 (c)(1),
(2) Date: Apr. 24, 2023

(87) PCT Pub. No.: WO2023/206317

PCT Pub. Date: Nov. 2, 2023

(65) Prior Publication Data

US 2024/0379034 A1 Nov. 14, 2024

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0452* (2013.01);
(Continued)

(58) Field of Classification Search
CPC ................. G09G 3/006; G09G 3/3233; G09G 2300/0452; G09G 2320/0233;
(Continued)

(56) References Cited

U.S. PATENT DOCUMENTS 10,818,217 B1 * 10/2020 Hsiang ................. G09G 3/2007
11,127,356 B2 * 9/2021 Li ........................ G09G 3/3225
(Continued)

FOREIGN PATENT DOCUMENTS

CN 101542581 A 9/2009
CN 103886829 A 6/2014
(Continued)

*Primary Examiner* — Benyam Ketema
(74) *Attorney, Agent, or Firm* — HOUTTEMAN LAW LLC

(57) ABSTRACT

Provided is a display panel, including: a storage module configured to store a first mapping relationship table, the first mapping relationship table showing correspondence between luminance accumulation amounts of each light emitting element in the display panel and luminance compensation gain values; an accumulation module configured to accumulate, when the display panel being powered on, luminance data of each light emitting element in real time to obtain a real-time accumulation amount of the luminance data; a main control module configured to search, according to the real-time accumulation amount of the luminance data, a corresponding luminance compensation gain value in the first mapping relationship table; calculate a real-time data signal for lighting each light emitting element according to the luminance compensation gain value and a real-time target luminance value of the light emitting element; light the light emitting element in real time according to the real-time data signal.

20 Claims, 6 Drawing Sheets

(52) U.S. Cl.
CPC ............... *G09G 2320/0233* (2013.01); *G09G 2320/0242* (2013.01); *G09G 2320/045* (2013.01); *G09G 2330/12* (2013.01); *G09G 2360/16* (2013.01)

(58) Field of Classification Search
CPC ..... G09G 2320/0242; G09G 2320/045; G09G 2330/12; G09G 2360/16
See application file for complete search history.

(56) References Cited

U.S. PATENT DOCUMENTS

| | | | | |
|---|---|---|---|---|
| 11,373,591 | B2 * | 6/2022 | Li | G09G 3/3225 |
| 2009/0102757 | A1 * | 4/2009 | Chiou | G09G 3/32 345/76 |
| 2011/0175944 | A1 | 7/2011 | Kuo et al. | |
| 2013/0147693 | A1 * | 6/2013 | Bae | G09G 3/3225 345/82 |
| 2016/0098954 | A1 * | 4/2016 | Bae | G09G 3/3225 345/77 |
| 2016/0133175 | A1 * | 5/2016 | Lee | G09G 3/3208 345/694 |
| 2016/0253960 | A1 * | 9/2016 | Xie | G09G 3/3225 345/690 |
| 2017/0042002 | A1 * | 2/2017 | Asamura | H05B 45/22 |
| 2018/0075798 | A1 * | 3/2018 | Nho | G09G 3/32 |
| 2018/0182285 | A1 * | 6/2018 | Wang | G09G 5/10 |
| 2018/0261188 | A1 * | 9/2018 | Guo | G09G 3/20 |
| 2019/0180695 | A1 * | 6/2019 | Ha | G09G 3/2051 |
| 2019/0333452 | A1 * | 10/2019 | Kim | G09G 3/3225 |
| 2020/0111408 | A1 * | 4/2020 | Machida | G09G 3/2014 |
| 2020/0152154 | A1 * | 5/2020 | Chu | G09G 3/2003 |
| 2021/0183333 | A1 | 6/2021 | Holland et al. | |
| 2023/0134326 | A1 * | 5/2023 | Lee | G09G 3/3233 345/690 |

FOREIGN PATENT DOCUMENTS

| | | | | |
|---|---|---|---|---|
| CN | 104580828 | A | | 4/2015 |
| CN | 105321456 | A | | 2/2016 |
| CN | 105895056 | A | | 8/2016 |
| CN | 107993614 | A | | 5/2018 |
| CN | 108877687 | A | | 11/2018 |
| CN | 109377945 | A | | 2/2019 |
| CN | 109616050 | A | | 4/2019 |
| CN | 110164367 | A | * | 8/2019 |
| CN | 111145694 | A | | 5/2020 |
| CN | 111243509 | A | | 6/2020 |
| CN | 112071263 | A | | 12/2020 |
| CN | 113178160 | A | | 7/2021 |
| CN | 113380189 | A | | 9/2021 |
| JP | 2007072305 | A | | 3/2007 |

* cited by examiner

DISPLAY PANEL, METHOD FOR COMPENSATING FOR AGING OF DISPLAY PANEL AND DISPLAY DEVICE

TECHNICAL FIELD

The present disclosure relates to the field of display technology, and in particular, to a display panel, a method for compensating for aging of a display panel and a display device.

BACKGROUND

Active Matrix/Organic Light Emitting Diode (Active Matrix/Organic Light Emitting Diode) devices have the advantages such as self-luminescence, fast response, high contrast, low power consumption, and the like, and are increasingly applied to display devices. The active matrix/organic light emitting diode devices may adopt various structures, which may be selected as desired. For example, the active matrix Organic Light Emitting Diode device may be an Organic Light Emitting Diode (OLED), a Quantum Dot Light Emitting Diode (QLED), or a Micro Light Emitting Diode (Micro LED).

The active matrix/organic light emitting diode device is a current-driven light emitting device, an efficiency of which may be gradually decreased with time. The decrease in efficiency causes a decrease in luminance and an aged image sticking on the display panel. When the efficiency decreases to a certain degree, a life cycle of the the display panel may end and the display panel has to be scrapped.

SUMMARY

Embodiments of the present disclosure provide a display panel and a method for compensating for aging of the display panel and a display device.

In a first aspect, an embodiment of the present disclosure provides a display panel, including:

a storage module configured to store a first mapping relationship table, the first mapping relationship table being a correspondence relationship table in which a correspondence between luminance accumulation amounts and luminance compensation gain values of each of light emitting elements in the display panel is recorded;

an accumulation module configured to accumulate, in response to the display panel being powered on, luminance data of each light emitting element in real time to obtain a real-time accumulation amount of the luminance data; and a main control module configured to search, according to the real-time accumulation amount of the luminance data, a luminance compensation gain value corresponding to the real-time accumulation amount of the luminance data in the first mapping relationship table; calculate a real-time data signal for lighting each light emitting element according to the luminance compensation gain value corresponding to the real-time accumulation amount of the luminance data and a real-time target luminance value of the light emitting element; and light the light emitting element in real time according to the real-time data signal for lighting the light emitting element so as to enable the light emitting element to achieve the real-time target luminance.

In some implementations, the accumulation module includes a first short-term memory;

the first short-term memory is configured to start to accumulate, in response to the display panel being powered on, the luminance data of the light emitting element in real time; and the main control module is further configured to read and store the last accumulation result of the luminance data in the first short-term memory into a first cache in response to that the first short-term memory accumulates the luminance data of the light emitting element each time; read the last accumulation result of the luminance data in the first cache, and add the last accumulation result of the luminance data to current luminance data of the light emitting element lighted to obtain a current accumulation result of the luminance data; store the current accumulation result of the luminance data into a second cache; and store the current accumulation result of the luminance data in the second cache into the first short-term memory.

In some implementations, the first short-term memory is configured to accumulate the luminance data of the light emitting element from zero in response to the display panel being powered on.

In some implementations, the accumulation module further includes a long-term memory;

the long-term memory is configured to start to accumulate the luminance data of the light emitting element in real time in response to the display panel being powered on; and the main control module is configured to read and store the accumulation result of the luminance data in the first short-term memory into the first cache every time the long-term memory accumulates the luminance data of the light emitting element; read and store the last accumulation result of the luminance data in the long-term memory into the second cache; read and add accumulation results of the luminance data in the first cache and the second cache, and store added accumulation result of the luminance data in a third cache; and store the added accumulation result of the luminance data in the third cache into the long-term memory.

In some implementations, the long-term memory is configured to accumulate, in response to the display panel being powered on, the luminance data of the light emitting element from the last accumulation result of the luminance data.

In some implementations, the first short-term memory is configured to suspend accumulating the luminance data of the light emitting element in response to that the long-term memory accumulates the luminance data of the light emitting element;

or, the display panel further includes a second short-term memory configured to accumulate the luminance data of the light emitting element in real time from zero in response to that the first short-term memory suspends accumulating the luminance data of the light emitting element.

In some implementations, the storage module includes a third short-term memory;

the main control module is configured to read a real-time accumulation amount of the luminance data of the light emitting element in the long-term memory and store the real-time accumulation amount of the luminance data of the light emitting element into the third short-term memory; read the real-time accumulation amount of the luminance data of the light emitting element in the third short-term memory, and search, according to the real-time accumulation amount of the luminance data of the light emitting element, a luminance compensation gain value corresponding to the real-time accumulation amount of the luminance data of the light emitting element in the first mapping relationship table;

or, the main control module is configured to read a real-time accumulation amount of the luminance data of the light emitting element in the long-term memory, and search, in the first mapping relationship table, according to the real-time accumulation amount of the luminance data of the light emitting element, a luminance compensation gain value corresponding to the real-time accumulation amount of the luminance data of the light emitting element, and store the luminance compensation gain value into the third short-term memory.

In some implementations, the long-term memory is configured to accumulate the luminance data of the light emitting elements in at least one row each time.

In some implementations, the first short-term memory is configured to accumulate the luminance data of the light emitting elements in at least one row each time; and the second short-term memory is configured to accumulate the luminance data of the light emitting elements in at least one row each time.

In some implementations, the luminance data of the light emitting element accumulated each time and an actual luminance value of the light emitting element satisfy the following equation: $(L1/L2)^n=A1/A2$, where a value of n ranges from 1.4 to 1.6, A1 and A2 represent the luminance data of the light emitting element accumulated any two times, L1 represents the actual luminance value of the light emitting element corresponding to the luminance data A1, and L2 represents the actual luminance value of the light emitting element corresponding to the luminance data A2.

In some implementations, the main control module is configured to:

multiply the real-time target luminance value of the light emitting element with the luminance compensation gain value corresponding to the real-time accumulation amount of the luminance data to obtain a compensated luminance value;

convert the compensated luminance value into a digital current signal for driving the light emitting element to emit light; and convert the digital current signal to an analog voltage signal, the analog voltage signal being a real-time data signal for lighting the light emitting element.

In some implementations, the light emitting elements include a first light emitting element, a second light emitting element, a third light emitting element, and a fourth light emitting element which are different in color;

the storage module is further configured to store a second mapping relationship table, which is a correspondence table in which a correspondence between luminance accumulation amounts of the fourth light emitting element in the display panel and chromaticity compensation gain values is recorded;

the accumulation module is further configured to accumulate the luminance data of the fourth light emitting element in real time in response to that the display panel is powered on, so as to obtain the real-time accumulation amount of the luminance data; and the main control module is further configured to search, according to the real-time accumulation amount of the luminance data, in the second mapping relationship table, a chromaticity compensation gain value corresponding to the real-time accumulation amount of the luminance data; calculate a real-time data signal of a light emitting element with another color for compensating the chromaticity of the fourth light emitting element according to the chromaticity compensation gain value corresponding to the real-time accumulation amount of the luminance data and a real-time target luminance value of the fourth light emitting element; and light the light emitting element with another color for compensating the chromaticity of the fourth light emitting element in real time according to the real-time data signal of the light emitting element with another color, so as to enable the fourth light emitting element to achieve the real-time target luminance and a real-time target chromaticity.

In some implementations, the main control module is further configured to select light emitting elements of two different colors from the first light emitting element, the second light emitting element, and the third light emitting element for compensating the chromaticity according to a change in chromaticity before and after aging of the fourth light emitting element;

the second mapping relationship table includes a first relationship table and a second relationship table;

the first relationship table is a mapping relationship table in which a mapping relationship between the luminance accumulation amounts of the fourth light emitting element and first chromaticity compensation gain values of the light emitting element with one of the two different colors;

the second relationship table is a mapping relationship table in which a mapping relationship between the luminance accumulation amounts of the fourth light emitting element and second chromaticity compensation gain values of the light emitting element with the other of the two different colors;

the main control module is further configured to add the compensated luminance value of the selected light emitting element with one of the two different colors and a product of the real-time target luminance value of the fourth light emitting element and the first chromaticity compensation gain value corresponding to the real-time accumulation amount of the luminance data to obtain a first luminance value for compensating chromaticity; and add the compensated luminance value of the selected light emitting element with the other of the two different colors and a product of the real-time target luminance value of the fourth light emitting element and a second chromaticity compensation gain value corresponding to the real-time accumulation amount of the luminance data to obtain a second luminance value for compensating chromaticity; and respectively add the first luminance value for compensating chromaticity and the second luminance value for compensating chromaticity into real-time data signals of the light emitting elements of the two different colors for compensating the chromaticity of the fourth light emitting element.

In some implementations, the first light emitting element includes a red light emitting element; the second light emitting element includes a green light emitting element; the third light emitting element includes a blue light emitting element; and the fourth light emitting element includes a white light emitting element.

In some implementations, a plurality of the light emitting elements are provided, and the light emitting elements are arranged in an array;

the display panel further includes a detection and calculation module configured to detect and calculate to obtain the first mapping relationship table; and the detection and calculation module includes:

a first accumulation unit configured to light the light emitting elements for different time periods at a same luminance and/or for a same time period at different luminances and/or for different time periods at different luminances, respectively, the different time periods respectively corresponding to different time points to obtain the luminance accumulation amounts of each light emitting element at the different time points;

a first calculation unit configured to calculate efficiencies of each light emitting element at different time points based on the luminance accumulation amounts of the light emitting element at the different time points; and calculate the luminance compensation gain values of each light emitting element at different time points according to the efficiencies of each light emitting element at different time points; and a table creating unit configured to create the first mapping table in which the luminance accumulation amounts of each light emitting element at different time points are in one-to-one correspondence with the luminance compensation gain values of each light emitting element at different time points.

In some implementations, a plurality of fourth light emitting elements are provided;

the detection and calculation module is further configured to detect and calculate to obtain the second mapping relationship table;

the first accumulation unit is further configured to respectively light the fourth light emitting elements in the display panel for different time periods at a same luminance and/or for a same time period at different luminances and/or for different time periods at different luminances, the different time periods respectively corresponding to different time points to obtain the luminance accumulation amounts of each fourth light emitting element at different time points;

the first calculation unit is further configured to measure chromaticities of each fourth light emitting element at different time points, and calculate the chromaticity compensation gain values of each fourth light emitting element at different time points according to the chromaticities of each fourth light emitting element at different time points; and the table creating unit is further configured to create the second mapping relationship table in which the luminance accumulation amounts of each fourth light emitting element at different time points are in a one-to-one correspondence with the chromaticity compensation gain values of each fourth light emitting element at different time points.

In some implementations, the first accumulation unit is configured to extract and accumulate the luminance data of the light emitting elements in M rows in each frame of continuous N frames of pictures, the M rows of one frame being different from those in another frame, and the luminance data of each light emitting element is accumulated once after the N frames of pictures are displayed, where, M×N is a number of rows of light emitting elements in the display panel;

or, the first accumulation unit is configured to accumulate the luminance data of each light emitting element frame by frame.

In some implementations, in response to that lighting currents of the light emitting element before and after aging are the same, the efficiency of each light emitting element at each of different time points=an actual luminance value of the light emitting element at a current time point/an initial actual luminance value of the light emitting element before aging;

or, in response to that the lighting currents of the light emitting element before and after aging are different, the efficiency of the light emitting element at each of different time points=(an actual luminance value of the light emitting element at a current time point/a current lighting current of the light emitting element)/(an initial actual luminance value of the light emitting element before aging/an initial lighting current of the light emitting element before aging).

In some implementations, the luminance compensation gain value of each light emitting element at each of different time points=1/the efficiency of the light emitting element at the time point.

In a second aspect, an embodiment of the present disclosure provides a display device, including the display panel described above.

In a third aspect, an embodiment of the present disclosure provides a method for compensating for aging of a display panel, including:

detecting and calculating to obtain a first mapping relationship table in which a mapping relationship between luminance accumulation amounts of each of light emitting elements in the display panel and the luminance compensation gain values is recorded;

storing the first mapping relationship table into the display panel;

accumulating, in response to that the display panel is powered on, luminance data of each light emitting element in real time to obtain a real-time accumulation amount of the luminance data;

searching, according to the real-time accumulation amount of the luminance data, in the first mapping relationship table, a luminance compensation gain value corresponding to the real-time accumulation amount of the luminance data;

calculating a real-time data signal for lighting the light emitting element according to the luminance compensation gain value corresponding to the real-time accumulation amount of the luminance data and a real-time target luminance value of the light emitting element; and lighting the light emitting element in real time according to the real-time data signal for lighting the light emitting element so as to enable the light emitting element to achieve the real-time target luminance.

In some implementations, the light emitting elements include a first light emitting element, a second light emitting element, a third light emitting element, and a fourth light emitting element which are different in color, and the method further including:

detecting and calculating to obtain a second mapping relationship table in which a mapping relationship between the luminance accumulation amounts and chromaticity compensation gain values of the fourth light emitting element in the display panel is recorded;

storing the second mapping relationship table into the display panel;

accumulating, in response to that the display panel is powered on, luminance data of the fourth light emitting element in real time to obtain a real-time accumulation amount of the luminance data;

searching, according to the real-time accumulation amount of the luminance data, in the second mapping relationship table, a chromaticity compensation gain value corresponding to the real-time accumulation amount of the luminance data;

calculating a real-time data signal of light emitting element with another color for compensating for the chromaticity of the fourth light emitting element according to the chromaticity compensation gain value corresponding to the real-time accumulation amount of the luminance data and the real-time target luminance value of the fourth light emitting element; and lighting the light emitting element with another color for compensating for the chromaticity of the fourth light emitting element in real time according to the real-time data signal of the light emitting element with another color for compensating for the chromaticity of the fourth light emitting element so as to enable the fourth light emitting element to achieve the real-time target luminance and a real-time target chromaticity.

BRIEF DESCRIPTION OF DRAWINGS

The accompanying drawings are included to provide a further understanding of the embodiments of the present disclosure, and are incorporated in and constitute a part of this specification, illustrate embodiments of the present disclosure and together with the description serve to explain the principles of the present disclosure and not to limit the present disclosure. The above and other features and advantages will become more apparent to those skilled in the art by describing in detail exemplary embodiments thereof with reference to the accompanying drawings, in which.

DETAIL DESCRIPTION OF EMBODIMENTS

Figure 1:
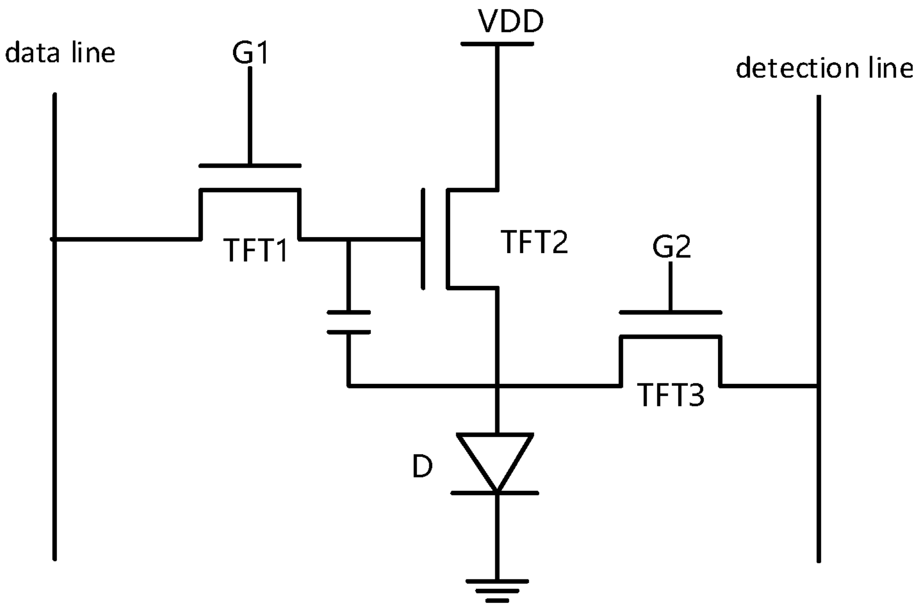
FIG. 1 is a diagram of a pixel circuit for detecting aging for compensating characteristics of a thin film transistor in a pixel driving circuit for driving an OLED device in the related art.

In order to make those skilled in the art better understand the technical solutions of the embodiments of the present disclosure, the following describes a display panel, a method for compensating aging of a display panel, and a display device provided in the embodiments of the present disclosure in further detail with reference to the accompanying drawings and the detailed implementations.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that this disclosure will be thorough and complete, and will fully convey the scope of the present disclosure to those skilled in the art.

The embodiments of the present disclosure are not limited to the embodiments shown in the drawings, but include modifications of configurations formed based on a manufacturing process. Thus, the regions shown in the the drawings have schematic properties, and shapes of the regions shown in the drawings illustrate specific shapes of the regions, but are not intended to be limiting.

In the related art, Active Matrix/Organic Light Emitting Diode panels are widely used, but the Active Matrix Organic Light Emitting Diode Panels always face challenges such as image sticking and lifetime. An active matrix/organic light emitting diode device in the panel as a current-driven devices faces irreversible aging due to the current during the device being used, which causes an efficiency of the active matrix/organic light emitting diode device to be reduced, namely, the luminance of the active matrix/organic light emitting diode device can not reach an original luminance thereof for a same current applied thereto. If efficiencies of the active matrix/organic light emitting diode devices in the the active matrix/organic light emitting diode panel are decreased differently, an image sticking will occur. If the efficiencies are decreased to a certain value, for example, if the efficiencies are decreased to 50% of an initial efficiency, the panel has to face to be scrapped. In a driving circuit for the active matrix/organic light emitting diode device, the compensation for driving characteristics of a thin film transistor (TFT) is relatively mature at present, but direct compensation for an aged active matrix/organic light emitting diode device is rarely applied in practice.

In the related art, the compensation for aging of the active matrix/organic light emitting diode device (such as an OLED device) in the active matrix/organic light emitting diode panel is mainly performed by compensating for characteristics of the thin film transistor in a pixel driving circuit for driving the OLED device. FIG. 1 is a diagram of a pixel circuit for detecting aging for compensating characteristics of the thin film transistor in the pixel driving circuit for driving the OLED device in the related art. Referring to FIG.

1, in such solution, the compensation for the TFT is performed first; and then OLED devices D in the display panel are lighted row by row, a change in a voltage across an anode and a cathode of the OLED device D is detected, where the aging degree of the OLED device D can be reflected by the change in the voltage across the OLED device D, so that the aging of the OLED device D can be compensated.

For the method of compensating for aging of the OLED device in the related art, firstly, a complex pixel circuit is needed, which may result in reduction in an aperture ratio of the display panel; secondly, it is necessary to compensate for the characteristics of the TFT. However, it is found, by practical tests, that an influence of the characteristics of the TFT on the compensation for aging of the OLED device cannot be completely excluded during detecting the voltage across the anode and the cathode of the OLED device; thirdly, the compensation can be carried out only when the voltages across anodes and cathodes of the OLED device are in one-to-one correspondence with the efficiencies of the OLED device; in the practical tests, the correspondence relationship between the voltage across the anode and the cathode of the OLED device and the efficiency of the OLED device is related to a plurality of factors, and the correspondence relationships between the voltage across the anode and the cathode of the OLED device and the efficiency of the OLED devices in different display panels are different, namely, no definite correspondence relationship exists between the voltage across the anode and the cathode of the OLED device and the efficiency of the OLED device. Therefore, the solution of compensating for aging of the OLED device in the related art has a poor universality.

In addition, in the solution of compensating for aging of the OLED device in the related art, during detecting, it is necessary to light sub-pixels row by row, so that a bright line is generated, affecting the viewing experience and in turn resulting in that the solution of compensating for aging of the OLED device in the related art is difficult to be used popularly.

Figure 2:
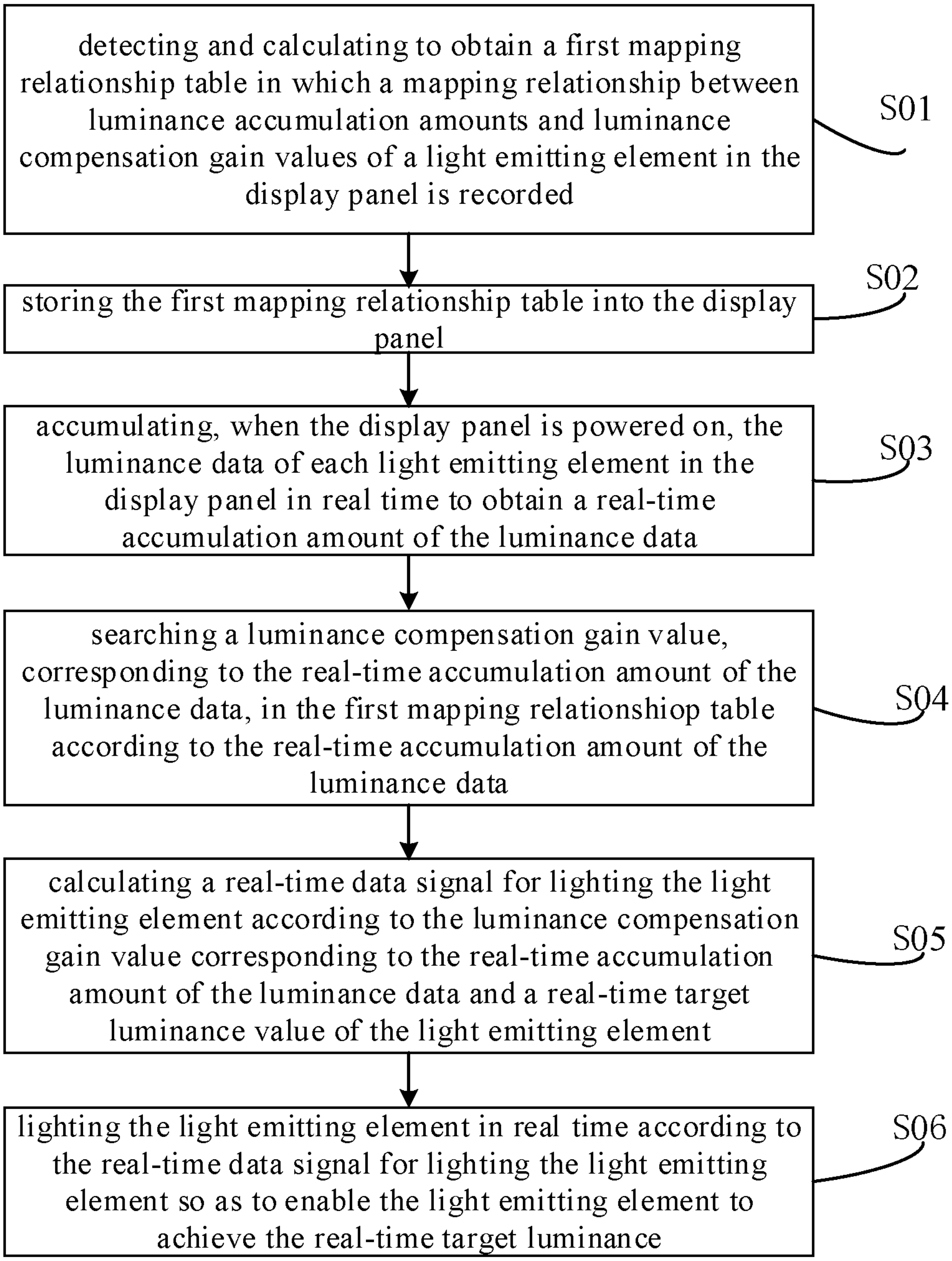
FIG. 2 is a flowchart illustrating a method for compensating for aging of a display panel according to an embodiment of the present disclosure.

In view of the above problems, in a first aspect, an embodiment of the present disclosure provides a method for compensating aging of a display panel. FIG. 2 is a flowchart illustrating a method for compensating for aging of the display panel. Referring to FIG. 2, the method includes steps S01 to S06.

At the step S01, detecting and calculating to obtain a first mapping relationship table between luminance accumulation amounts of a light emitting element in the display panel and luminance compensation gain values.

The display panel includes a plurality of light emitting elements which are arranged in an array. The step S01 specifically includes steps S011 to S014.

At the step S011, respectively lighting the light emitting elements in the display panel for different time periods at a same luminance, and/or lighting the light emitting elements for a same time period at different luminances, and/or lighting the light emitting elements for different time periods at different luminances, where the different time periods respectively correspond to different time points; and obtaining the luminance accumulation amounts of each light emitting element at the different time points.

In some implementations, the light emitting element may be an Organic Light Emitting Diode (OLED), a Quantum Dot Light Emitting Diode (QLED), a Micro Light Emitting Diode (Micro LED), a Mini LED (Mini LED), or the like.

In some implementations, during accumulating luminances of each light emitting element, the display panel is divided into a plurality of regions, and lighting luminances of the light emitting elements in different regions are different. For example, the display panel is divided into four regions, the lighting luminance of the light emitting element in the first region is 150 nit, the lighting luminance of the light emitting element in the second region is 200 nit, the lighting luminance of the light emitting element in the third region is 300 nit, and the lighting luminance of the light emitting element in the fourth region is 450 nit. The luminance of each light emitting element is accumulated once every different time period, for example, the luminance of each light emitting element is accumulated once every 24 hours first, and then the luminance of each light emitting element is accumulated once every 48 hours. The luminances of each light emitting element in one region are accumulated once every 24 hours and 48 hours, respectively, so that the accumulation of the luminances of each light emitting element in the region when the light emitting element is lighted for different time periods at the same luminance is realized; the luminances of each light emitting element in each region are accumulated when the light emitting element is lighted for 24 hours, so that the accumulation of the luminances of the light emitting element being lighted for the same time period at different luminances is realized; the luminances of each of the light emitting elements in respective regions are accumulated once every 24 hours and 48 hours, respectively, so that the accumulation of the luminances of the light emitting elements being lighted for different time periods at different luminances is realized. The process of accumulating the luminances of the light emitting elements described above mainly takes into account that the expectations of the luminance accumulation process on a data bandwidth and the storage capacity of a memory can be satisfied.

Figure 3:
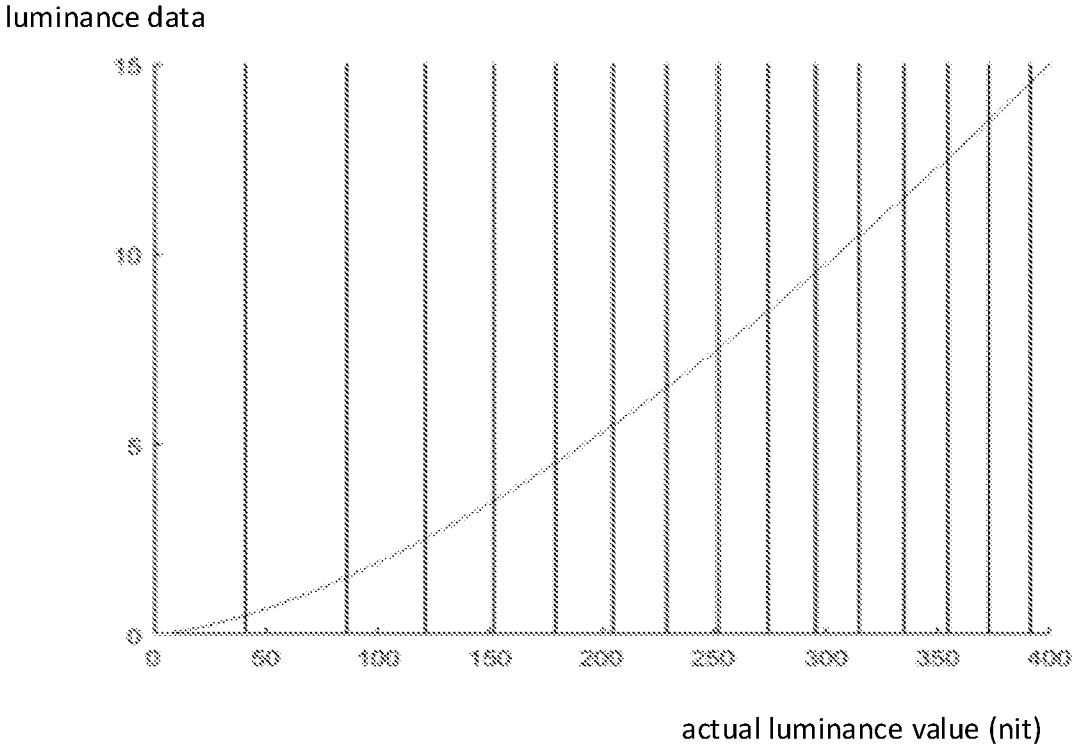
FIG. 3 is a curve illustrating a correspondence relationship between actual luminance values of a light emitting element and accumulated luminance data of the light emitting element during a luminance accumulation process of the light emitting element.

FIG. 3 is a curve illustrating a correspondence relationship between actual luminance values of the light emitting element and accumulated luminance data of the light emitting element during the luminance accumulation process of the light emitting element. In FIG. 3, an ordinate of the two-dimensional coordinate system in which the correspondence curve is located represents the luminance data of the light emitting element accumulated each time; the luminance data of the light emitting element accumulated each time is an actual luminance accumulation value on an ordinate axis of the correspondence curve obtained in accordance with the actual luminance value of the light emitting element indicated by an abscissa in FIG. 3; the abscissa represents the actual luminance value (i.e., actual luminance, an unit of which is nit) of the light emitting element. Since the actual luminance value (i.e., the actual luminance, the unit of which is nit) of the light emitting element and the aging condition of the light emitting element are not in a linear relationship therebetween, but satisfy an exponential relationship shown in FIG. 3, when different luminances of the light emitting element are accumulated, the actual luminance values of the light emitting element cannot be directly accumulated, but the actual luminance value of the light emitting element represented by abscissa in the two-dimensional coordinate system where the correspondence curve in FIG. 3 is located is converted into luminance data of the light emitting element on the ordinate axis according to the curve, and then the luminance data of the light emitting element is accumulated, and an accumulation result of the luminance data of the light emitting element is taken as luminance accumulation amounts of the light emitting element at different time points.

In some implementations, the luminance data of the light emitting element accumulated each time and an actual luminance value of the light emitting element satisfy the equation: $(L1/L2)^n=A1/A2$; where n ranges from 1.4 to 1.6, A1 and A2 represent the luminance data of the light emitting element accumulated any two times, L1 represents the actual luminance value of the light emitting element corresponding to the luminance data A1, and L2 represents the actual luminance value of the light emitting element corresponding to the luminance data A2.

In some implementations, the obtaining the luminance accumulation amounts of each light emitting element at different time points includes: extracting luminance data of light emitting elements in M rows from each of continuous N frames of pictures for accumulation, the M rows of light emitting elements in one frame of picture being different from those in another frame of picture; and accumulating the luminance data of all the light emitting elements once after the N frames of pictures are displayed, where M×N is the number of rows of light emitting elements in the display panel. That is, the luminance data of each of the light emitting elements in M rows in each frame of picture are extracted and accumulated, the M rows of light emitting elements in one frame of picture being different from those in another frame of picture; and after N frames of pictures, the luminance data of each light emitting element in the display panel is accumulated once. The accumulation method is suitable for a case that the storage capacity of the memory for storing the luminance accumulation amount is not large and thus less data can be stored.

In some implementations, the obtaining the luminance accumulation amounts of each light emitting element at different time points includes: accumulating the luminance data of each light emitting element frame by frame. That is, the luminance data of all the light emitting elements in the display panel is respectively accumulated once per frame. The accumulation method is suitable for a case that the storage capacity of the memory for storing the luminance accumulation amount is large and thus more data can be stored.

It should be noted that, the luminance accumulation amounts of each light emitting element at different time points may be obtained by other accumulation methods, as long as it is ensured that the luminance data of each of the light emitting elements in the display panel is accumulated, and it is ensured that all the luminance accumulation amounts, increasing sequentially from small to large, of each light emitting element are all accumulated. As long as all the luminance accumulation amounts, increasing sequentially from small to large, of the light emitting elements are all accumulated, it is ensured that the respective luminance accumulation amounts of the light emitting elements can be compensated with different luminance compensation gain values, respectively, so that more accurate compensation for aging of the light emitting element can be realized, and the display quality of the display panel can be improved.

At the step S012, calculating efficiencies of each light emitting element at different time points according to the luminance accumulation amounts of each light emitting element at different time points.

In this step, in a case that lighting currents for the light emitting element are the same before and after aging of the light emitting element, the efficiency of the light emitting element at any of different time points=the actual luminance value of the light emitting element at the current time point/an initial actual luminance value of the light emitting element before aging of the light emitting element. That is, $X=L_{current}/L_{initial}$, where X is the efficiency of the light emitting element at any of different time points, $L_{current}$ is the actual luminance value of the light emitting element at the current time point, and $L_{initial}$ is the initial actual luminance value of the light emitting element before aging of the light emitting element.

In some implementations, in a case that the lighting currents for the light emitting element are different before and after aging of the light emitting element, the efficiency of the light emitting element at any of different time points=(the actual luminance value of the light emitting element at the current time point/a current lighting current for the light emitting element)/(the initial actual luminance value of the light emitting element before aging of the light emitting element/an initial lighting current for the light emitting element before aging of the light emitting element). That is, $X=(L_{current}/I_{current})/(L_{initial}/I_{initial})$, where X is the efficiency of the light emitting element at any of different time points, $L_{current}$ is the actual luminance value of the light emitting element at the current time point, the $L_{initial}$ is the initial actual luminance value of the light emitting element before aging of light emitting element, $I_{current}$ is the current lighting current for the light emitting element, and $I_{initial}$ is the initial lighting current before aging of the light emitting element.

At step S013, calculating luminance compensation gain values of each light emitting element at different time points according to the efficiencies of the light emitting element at different time points.

In this step, the luminance compensation gain value of the light emitting element at each of different time points=1/efficiency of the light emitting element at the each of different time points.

At step S014, creating a first mapping relationship table in which the luminance accumulation amounts of each light emitting element at different time points are in a one-to-one correspondence with the luminance compensation gain value of the light emitting element at different time points.

Figure 4:
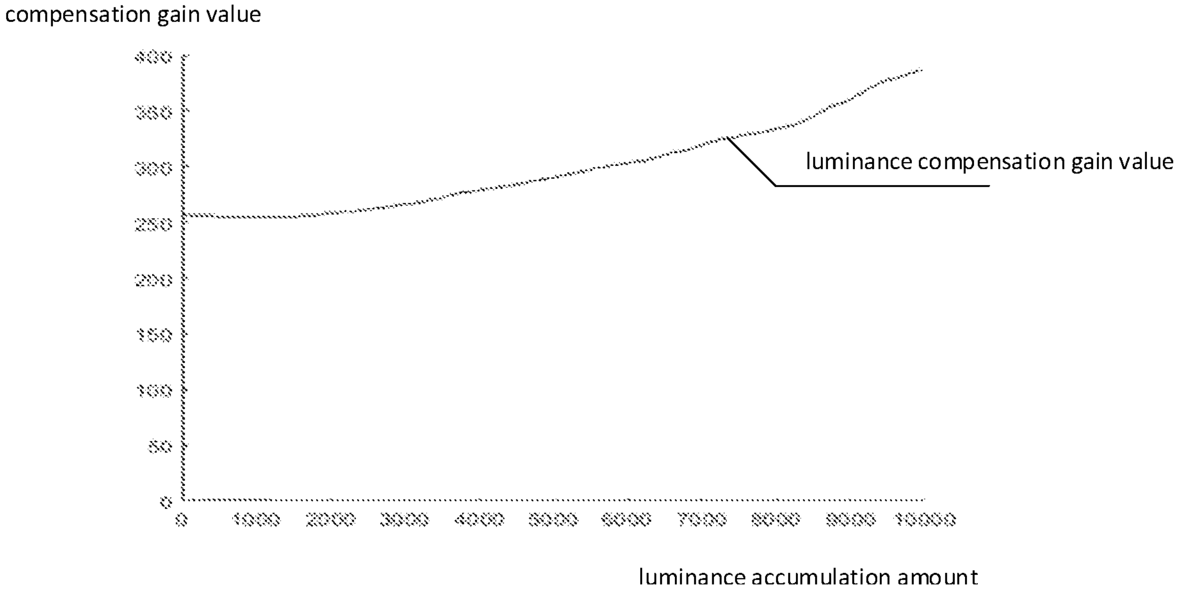
FIG. 4 is a curve illustrating a correspondence between luminance accumulation amounts of a light emitting element and luminance compensation gain values in an embodiment of the present disclosure.

FIG. 4 is a curve illustrating a correspondence between the luminance accumulation amounts of the light emitting element and the luminance compensation gain values in an embodiment of the present disclosure.

In some implementations, the light emitting elements include a first light emitting element, a second light emitting element and a third light emitting element with different colors. In some implementations, the first light emitting element includes a red light emitting element, the second light emitting element includes a green light emitting element, and the third light emitting element includes a blue light emitting element. The correspondence curve between the luminance accumulation amounts of the light emitting element with each color and the luminance compensation gain values can be referred to the correspondence curve in FIG. 4.

At step S02, storing the first mapping relationship table into the display panel.

In this step, the first mapping relationship table is stored in a timing controller (i.e., TCON) in the display panel.

At step S03, accumulating, when the display panel is powered on, the luminance data of each light emitting element in the display panel in real time to obtain a real-time accumulation amount of the luminance data.

The display panel includes a first short-term memory. The first short-term memory employs a double data rate (DDR) synchronous dynamic random access memory.

Figure 5:
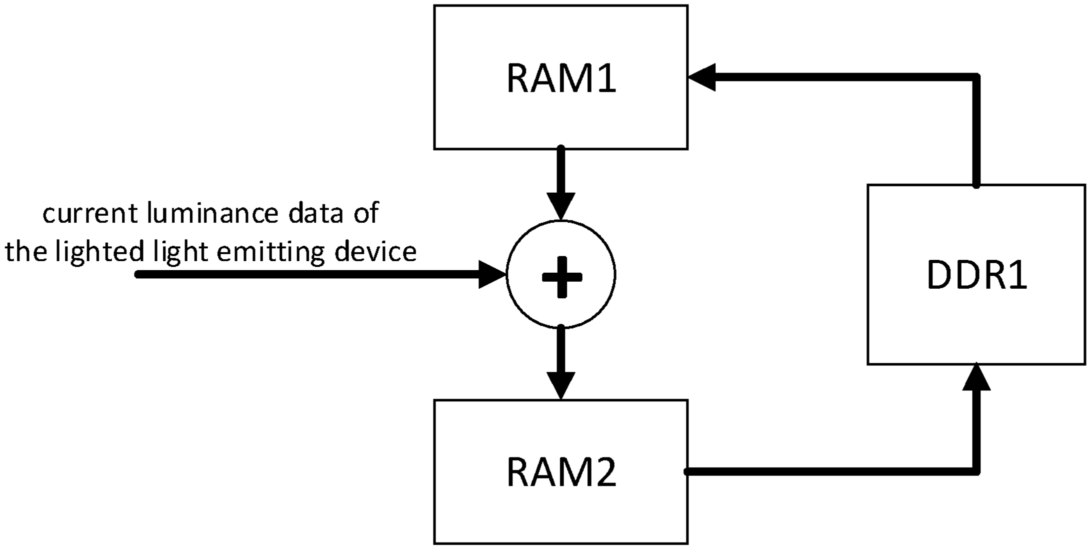
FIG. 5 is a schematic diagram illustrating a principle that a first short-term memory accumulates luminance data of a light emitting element each time.

The step S03 includes the following steps: when the display panel is powered on, the first short-term memory starts to accumulate the luminance data of each light emitting element in real time. FIG. 5 is a schematic diagram illustrating a principle that the first short-term memory accumulates the luminance data of each light emitting element every time; the first short-term memory DDR1 accumulating the luminance data of each light emitting element each time includes: reading a last accumulation result of the luminance data in the first short-term memory DDR1 and storing it into a first cache RAM1; reading the last accumulation result of the luminance data in the first cache RAM1, and adding the last accumulation result of the luminance data to current luminance data of each light emitting element being lighted to obtain a current accumulation result of the luminance data; storing the current accumulation result of the luminance data into a second cache RAM2; and storing the current accumulation result of the luminance data in the second cache RAM2 into the first short-term memory DDR1.

In some implementations, when the display panel is powered on, the first short-term memory DDR1 accumulates the luminance data of each light emitting element from zero. The accumulated luminance data in the first short-term memory DDR1 is cleared when the display panel is powered off.

In some implementations, the first short-term memory accumulates the luminance data of at least one row of light emitting elements each time. That is, the amount of the luminance data to be accumulated each time by the first short-term memory may be determined according to the storage capacity of the first short-term memory. In a case that the storage capacity of the first short-term memory is small, the luminance data of one or several rows of light emitting elements can be accumulated each time, and in a case that the first short-term memory has a large storage capacity, the luminance data of the light emitting elements in one or several frames of pictures can be accumulated each time.

In some implementations, the display panel further includes a long-term memory. The long-term memory employs an eMMC (Embedded multimedia Card) with an MMC interface, a flash memory device, and a host controller.

Figure 6:
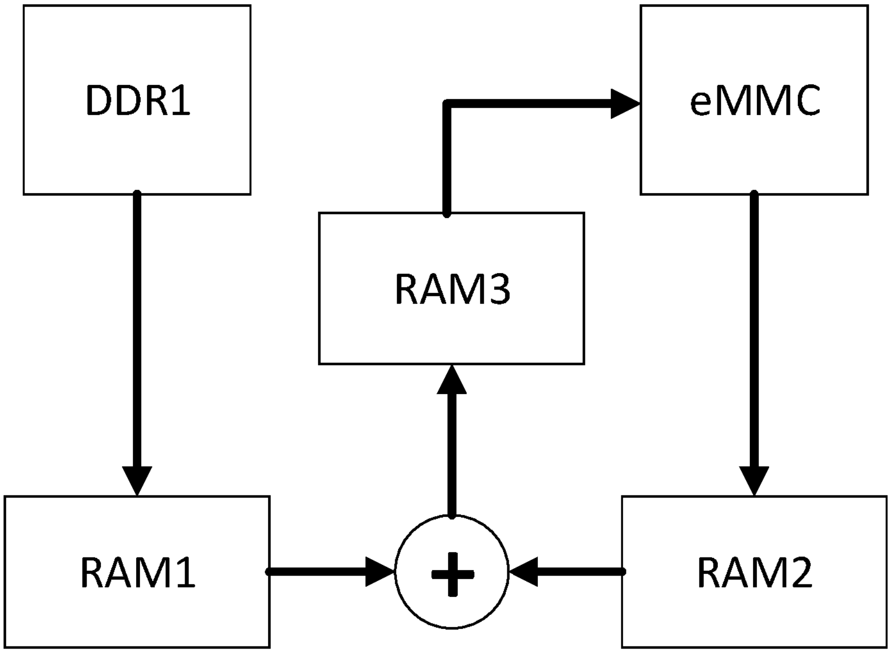
FIG. 6 is a schematic diagram illustrating a principle that a long-term memory accumulates luminance data of a light emitting element each time.

In some implementations, the step S03 specifically further includes the following steps: when the display panel is powered on, the long-term memory starts to accumulate the luminance data of each light emitting element in real time. FIG. 6 is a schematic diagram illustrating a principle that the long-term memory accumulates luminance data of each light emitting element each time; the long-term memory eMMC accumulating the luminance data of each light emitting element each time includes: reading the accumulation result of the luminance data in the first short-term memory DDR1 and storing it into the first cache RAM1; reading the last accumulation result of the luminance data in the long-term memory eMMC and storing it into the second cache RAM2; reading and adding the accumulation results of the luminance data in the first cache RAM 1 and the second cache RAM 2, and storing the added accumulation result of the luminance data into a third cache RAM3; and storing the added accumulation result of the luminance data in the third cache RAM3 into the long-term memory eMMC.

In some implementations, the long-term memory eMMC accumulates, when the display panel is powered on, the luminance data of each light emitting element based on the last accumulation result of the luminance data. The long-term memory eMMC does not lose data when the display panel is powered off.

In some implementations, the long-term memory accumulates the luminance data of at least one row of light emitting elements each time. The amount of the luminance data to be accumulated by the long-term memory each time may be determined according to a cache capacity of the third cache. In a case that the cache capacity of the third cache is relatively small, the long-term memory can accumulate the luminance data of one or more rows of light emitting elements each time, and in a case that the cache capacity of the third cache is relatively large, the long-term memory may accumulate the luminance data of each light emitting element in one or several frames of pictures each time until the accumulation of the luminance data of each light emitting element in an entire frame of picture is finished.

In some implementations, the first short-term memory suspends accumulating the luminance data of each light emitting element while the long-term memory accumulates the luminance data of each light emitting element. When the long-term memory accumulates the luminance data, the first short-term memory cooperates to store the accumulated luminance data therein into the long-term memory, therefore, when the long-term memory accumulates the luminance data, the first short-term memory suspends the accumulation of the luminance data. Meanwhile, since the luminance data of each light emitting element is generally accumulated by the first short-term memory firstly and then the luminance data accumulated by the first short-term memory is stored into the long-term memory, when the long-term memory accumulates the luminance data, the first short-term memory cannot accumulate the real-time luminance data of the OLED. In such case, if no other short-term memory accumulates the real-time luminance data of each light emitting element, the real-time luminance data of part of the light emitting elements may be lost.

In some implementations, the display panel further includes a second short-term memory. The second short-term memory employs a double data rate (DDR) synchronous dynamic random access memory. When the first short-term memory suspends accumulation of the luminance data of each light emitting element, the second short-term memory accumulates the luminance data of each light emitting element in real time from zero. The second short-term memory can accumulate the luminance data of each light emitting element in real time when the first short-term memory suspends accumulation of luminance data of each light emitting element, so that the real-time luminance data of the light emitting element is prevented from being lost, the accumulation result of the real-time luminance data of each light emitting element is more accurate, and the accuracy of compensation for aging of the light emitting element is finally ensured.

In some implementations, the second short-term memory accumulates the luminance data of at least one row of light emitting elements each time. That is, the amount of the luminance data to be accumulated each time by the second short-term memory may be determined according to the storage capacity of the second short-term memory. In a case that the storage capacity of the second short-term memory is relatively small, the luminance data of one or several rows of light emitting elements can be accumulated each time, and in a case that the storage capacity of the second short-term memory is relatively large, the luminance data of each light emitting element in one or several frames of pictures can be accumulated each time.

In the present embodiment, referring to FIG. 2, in the step S03, when the display panel is powered on, the luminance data of each light emitting element is accumulated in real time to obtain a real-time accumulation amount of the luminance data, and the luminance data of each light emitting element accumulated each time and the actual luminance value of the light emitting element satisfy the following equation: $(L1/L2)^n$=A1/A2, where n ranges from 1.4 to 1.6, A1 and A2 represent luminance data of the light emitting element accumulated any two times, L1 represents the actual luminance value of the light emitting element corresponding to luminance data A1, and L2 represents the actual luminance value of the light emitting element corresponding to luminance data A2.

At step S04, searching a luminance compensation gain value, corresponding to the real-time accumulation amount of the luminance data, in the first mapping relationship table according to the real-time accumulation amount of the luminance data.

This step includes the following steps S041 to S042.

At step S041, reading, when the display panel being powered on, the real-time accumulation amount of the luminance data of each light emitting element in the long-term memory and storing it into a third short-term memory.

At step S042, reading the real-time accumulation amount of the luminance data of each light emitting element in the third short-term memory, and searching the luminance compensation gain value, corresponding to the real-time accumulation amount of the luminance data, in the first mapping relationship table according to the real-time accumulation amount of the luminance data.

In some implementations, the step S04 specifically includes a step S041': reading, when the display panel being powered on, the real-time accumulation amount of the luminance data of each light emitting element in the long-term memory; and a step S042': searching a luminance compensation gain value, corresponding to the real-time accumulation amount of the luminance data, in the first mapping relationship table according to the real-time accumulation amount of the luminance data, and storing the luminance compensation gain value into a third short-term memory.

In some implementations, one third short-term memory or a group of third short-term memories may be provided.

In some implementations, the third short-term memory employs a double data rate (DDR) synchronous dynamic random access memory.

At step S05: calculating a real-time data signal for lighting the light emitting element according to the luminance compensation gain value corresponding to the real-time accumulation amount of the luminance data and a real-time target luminance value of the light emitting element.

In some implementations, the step S05 specifically includes steps S051 and S052.

At step S501, multiplying the real-time target luminance value of the light emitting element by the luminance compensation gain value corresponding to the real-time accumulation amount of the luminance data to obtain a compensated luminance value.

The real-time target luminance value of the light emitting element refers to a real-time luminance value (i.e., actual luminance, the unit of which is nit) of the light emitting element before aging of the light emitting element. The compensated luminance value needs to be provided for the aged light emitting element, so that the aged light emitting element can realize the real-time target luminance value thereof after being compensated.

At step S052: converting the compensated luminance value into a digital current signal for driving the light emitting element to emit light.

The compensated luminance value is positively correlated with the digital current signal for driving the light emitting element to emit light.

At step S053, converting the digital current signal into an analog voltage signal; the analog voltage signal being a real-time data signal for lighting the light emitting element.

The real-time data signal for lighting the light emitting element is provided to a driving circuit of the light emitting element through a data line, and the driving circuit drives the light emitting element to emit light.

Figure 7:
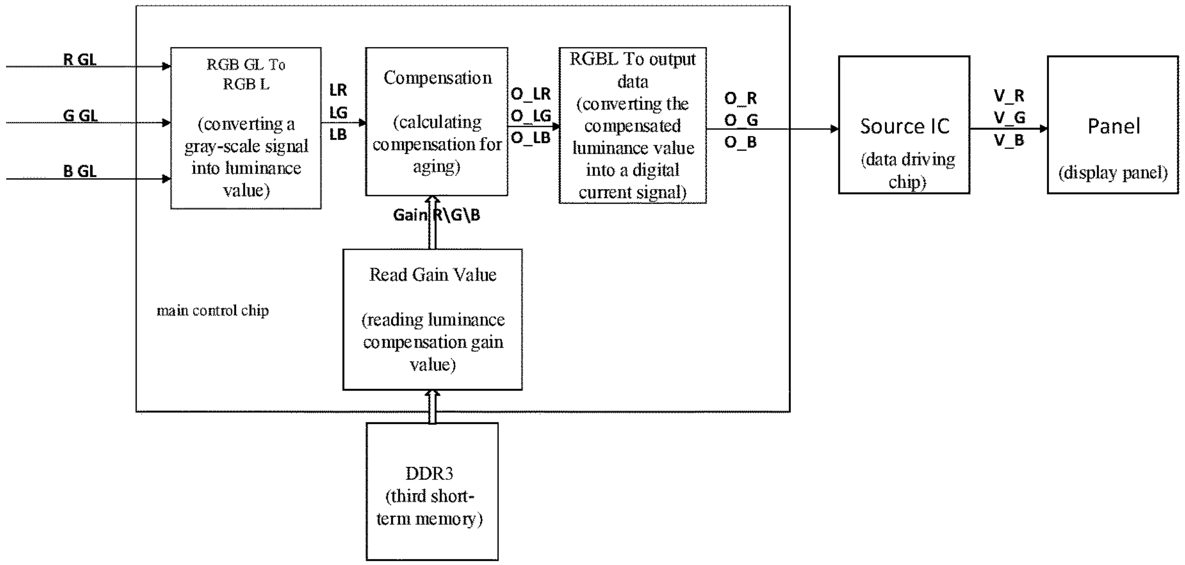
FIG. 7 is a block diagram illustrating a flowchart of compensating luminance of an aged display panel including red, green, and blue light emitting elements according to an embodiment of the present disclosure.

Referring to FIG. 7, which is a block diagram illustrating a flowchart of compensating luminance of an aged display panel including red, green, and blue light emitting devices according to an embodiment of the present disclosure. R GL, G GL and B GL signals input to a main control chip are gray scale signals of the red light emitting element, the green light emitting element and the blue light emitting element, respectively; LR, LG, and LB are luminance values (i.e., actual luminances, the units of which are nit) of the red light emitting element, the green light emitting element, and the blue light emitting element, respectively; that is, the main control chip converts the gray scale signal of each light emitting element into the luminance value (i.e., the actual luminance, the unit of which is nit) of the light emitting element; the main control chip reads the luminance compensation gain values (i.e., GainR, GainG, and GainB) of the light emitting elements with different colors in the third short-term memory DDR3, obtains the compensated luminance values (i.e., O_LR, O_LG and O_LB) of the light emitting elements with different colors through compensation and calculation operations; then respectively converts the compensated luminance values of the light emitting elements with different colors into digital current signals (i.e., O_R, O_G, O_B) for driving the light emitting elements to emit light; finally, a data driving chip (i.e., a Source IC) converts the digital current signals into analog voltage signals (i.e., V_R, V_G, V_B) which are real-time data signals for lighting the light emitting elements, and the analog voltage signals are supplied to the light emitting elements in the display panel (i.e., Panel) through data lines.

The compensation calculation formulas of the light emitting elements with different colors are respectively as follows: O_LR=LR×GainR; O_LG=LG×GainG; O_LB=LB×GainB; where, GainR, GainG, GainB are the luminance compensation gain values of the red light emitting element, the green light emitting element, and the blue light emitting element, respectively.

At step S06, lighting the light emitting elements in real time according to the real-time data signals for lighting the light emitting elements so as to enable the light emitting elements to achieve the real-time target luminances.

The real-time target luminance of each light emitting element refers to a real-time luminance value (i.e., actual luminance, the unit of which is nit) of the light emitting element before aging.

In some implementations, the light emitting elements include a first light emitting element, a second light emitting element, a third light emitting element, and a fourth light emitting element with different colors. In the method for compensating for aging of the display panel, the step S01 further includes: detecting and calculating to obtain a second mapping relationship table in which the luminance accumulation amounts of the fourth light emitting element in the display panel correspond to chromaticity compensation gain values.

In some implementations, the display panel may include a plurality of fourth light emitting elements, and the step S011 may further include: respectively lighting the fourth light emitting elements in the display panel for different time periods at a same luminance, and/or for a same time period at different luminances, and/or for different time periods at different luminances, where the different time periods correspond to different time points, respectively; and obtaining the luminance accumulation amounts of each fourth light emitting element at different time points.

In the step S011, referring to FIG. 3, during the luminance accumulation process of the fourth light emitting element, the correspondence relationship between the actual luminance value of the fourth light emitting element and the accumulated luminance data of the fourth light emitting element also satisfies the exponential relationship shown in FIG. 3, namely, $(L1/L2)^n=A1/A2$; that is, when different luminances of the fourth light emitting element are accumulated, the actual luminance values of the fourth light emitting element cannot be directly accumulated, but the actual luminance value of the fourth light emitting element, which is indicated by an abscissa in a two-dimensional coordinate system where the correspondence curve is located, is converted into a corresponding luminance data of the fourth light emitting element on the ordinate axis according to the correspondence curve in FIG. 3, and then the luminance data of the fourth light emitting element is accumulated, and accumulation results of the luminance data of the fourth light emitting element is used as the luminance accumulation amounts of the fourth light emitting element at different time points.

In some implementations, the specific process and method for obtaining the luminance accumulation amounts of the fourth light emitting element at different time points are the same as the process and method for obtaining the luminance accumulation amounts of the first light emitting element, the second light emitting element and the third light emitting element at different time points, and are not described again here.

The step S012 further includes: measuring chromaticity values of each fourth light emitting element at different time points.

The step S013 further includes: calculating the chromaticity compensation gain values of each fourth light emitting element at different time points according to the chromaticity values of each fourth light emitting element at different time points.

In this step, the chromaticity compensation gain values at different time points may be calculated according to the chromaticity values at different time points and an initial chromaticity value (i.e., the chromaticity value before aging).

The step S014 further includes: creating a second mapping relationship table in which the luminance accumulation amounts of each fourth light emitting element at different time points are in one-to-one correspondence with the chromaticity compensation gain values of the fourth light emitting element at different time points.

In some implementations, the first light emitting element includes the red light emitting element; the second light emitting element includes the green light emitting element; the third light emitting element includes the blue light emitting element; and the fourth light emitting element includes a white light emitting element.

The correspondence curve between the luminance accumulation amounts of the fourth light emitting element and the luminance compensation gain values may refer to the correspondence curve in FIG. 4.

Figure 8:
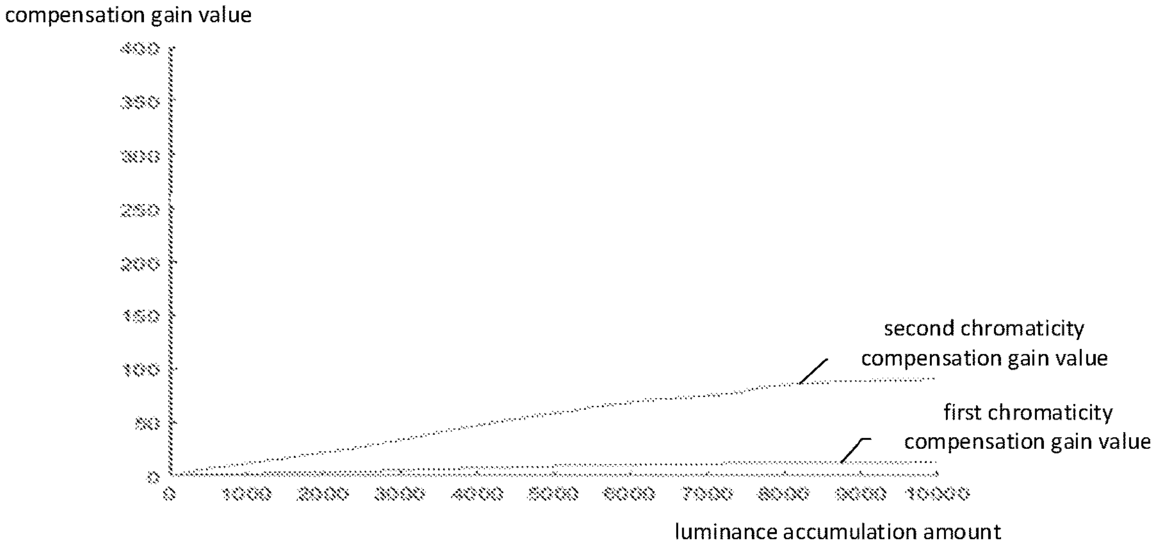
FIG. 8 shows curves illustrating a correspondence between luminance accumulation amounts of a white light emitting element and first chromaticity compensation gain values and a correspondence between the luminance accumulation amounts of the white light emitting element and second chromaticity compensation gain values according to an embodiment of the present disclosure.

In some implementations, light emitting elements of two different colors are selected for compensating chromaticity among the first light emitting element, the second light emitting element, and the third light emitting element according to a change in chromaticity before and after aging of the fourth light emitting element. The second mapping relationship table includes a first relationship table and a second relationship table. The first relationship table is a mapping relationship table in which a mapping relationship between the luminance accumulation amounts of the fourth light emitting element and first chromaticity compensation gain values of one of the two light emitting elements in different colors is recorded. The second relationship table is a mapping relationship table in which a mapping relationship between the luminance accumulation amounts of the fourth light emitting element and second chromaticity compensation gain values of the light emitting element of the other of the two colors is recorded. FIG. 8 shows curves illustrating a correspondence between the luminance accumulation amounts of a white light emitting element and first chromaticity compensation gain values and a correspondence between the luminance accumulation amounts of the white light emitting element and second chromaticity compensation gain values according to an embodiment of the present disclosure. The first relationship table is a mapping relationship table in which a mapping relationship between the luminance accumulation amounts of the white light emitting element and the first chromaticity compensation gain values of the green light emitting element is recorded; the second relationship table is a mapping relationship table in which a mapping relationship between the luminance accumulation amounts of the white light emitting element and the second chromaticity compensation gain values of the blue light emitting element is recorded.

The step S02 further includes: storing the second mapping relationship table into the display panel.

In this step, the second mapping relationship table is stored in the timing controller (i.e., TCON) in the display panel.

The step S03 further includes: accumulating, when the display panel being powered on, the luminance data of the fourth light emitting element in real time to obtain a real-time accumulation amount of the luminance data.

The step S04 further includes: searching, according to the real-time accumulation amount of the luminance data, a chromaticity compensation gain value corresponding to the real-time accumulation amount of the luminance data in the second mapping relationship table.

The step S05 further includes: calculating real-time data signals of the light emitting elements with other colors for compensating for the chromaticity of the fourth light emitting element according to the chromaticity compensation gain value corresponding to the real-time accumulation amount of the luminance data and the real-time target luminance value of the fourth light emitting element.

In the step S05, the step S051 further includes: adding the compensated luminance value of the selected light emitting element with one of the two colors and a product of the real-time target luminance value of the fourth light emitting element and the first chromaticity compensation gain value corresponding to the real-time accumulation amount of the luminance data to obtain a first luminance value for compensating chromaticity; adding the compensated luminance value of the selected light emitting element with the other of the two colors and a product of the real-time target luminance value of the fourth light emitting element and the second chromaticity compensation gain value corresponding to the real-time accumulation amount of the luminance data to obtain a second luminance value for compensating chromaticity and respectively adding the first luminance value for compensating chromaticity and the second luminance value for compensating chromaticity into real-time data signals of the light emitting elements of two different colors for compensating for the chromaticity of the fourth light emitting element.

The real-time target luminance value of the fourth light emitting element refers to a real-time luminance value (i.e., actual luminance, the unit of which is nit) of the fourth light emitting element before aging of the fourth light emitting element. The first luminance value for compensating chromaticity and the second luminance value for compensating chromaticity are provided for the light emitting elements of two different colors for compensating for the chromaticity of the aged fourth light emitting element, so that the aged fourth light emitting element can achieve its real-time target chromaticity value after being compensated.

Figure 9:
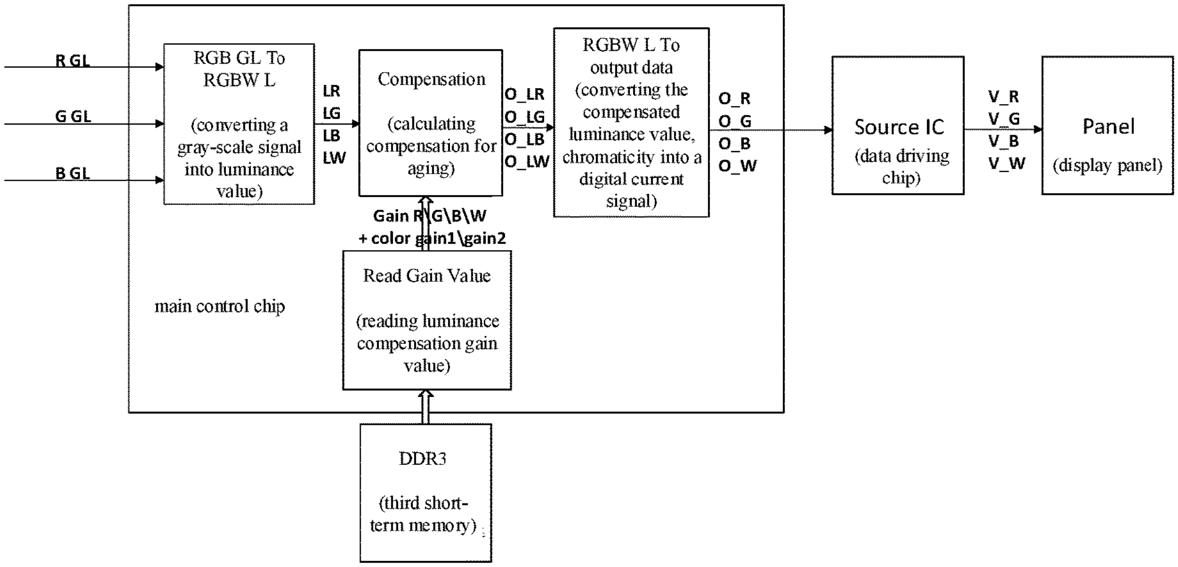
FIG. 9 is a block diagram illustrating a flowchart of compensating luminance and chromaticity of an aged display panel including red, green, blue, and white light emitting devices according to an embodiment of the present disclosure.

FIG. 9 is a block diagram illustrating a flowchart of compensating luminance and chromaticity of an aged display panel including red, green, blue, and white light emitting devices according to an embodiment of the present disclosure. In some implementations, referring to FIG. 9, R GL, G GL and B GL signals input to the main control chip are gray scale signals of a red light emitting element, a green light emitting element and a blue light emitting element respectively; LR, LG, LB, LW represent luminance values (i.e., actual luminances, the units of which are nit) of the red light emitting element, the green light emitting element, the blue light emitting element, and a white light emitting element, respectively; that is, the main control chip converts the gray scale signals of the light emitting elements into the luminance values (i.e., the actual luminances, the units of which are nit) of the light emitting elements; the main control chip reads the luminance compensation gain values (i.e., GainR, GainG, GainB, GainW) of the light emitting elements with different colors in the third short-term memory DDR3, and the first chromaticity compensation gain value (Color_Gain1) and the second chromaticity compensation gain value (Color_Gain2) of the light emitting elements with two different colors, obtains the compensated luminance values (i.e., O_LR, O_LG, O_LB) of the light emitting elements with different colors and the compensated chromaticity value (i.e., O_LW) of the white light emitting element through the compensation and calculation operations, and then respectively converts the compensated luminance values of the light emitting elements in different colors and the compensated chromaticity value of the white light emitting element into digital current signals (i.e., O_R, O_G, O_B, O_W) for driving the light emitting elements to emit light; finally, a data driving chip (i.e., a Source IC) converts the digital current signals into analog voltage signals (i.e., V_R, V_G, V_B, V_W), where the analog voltage signals are real-time data signals for lighting the light emitting elements, and the analog voltage signals are supplied to the light emitting elements in the display panel (i.e., Panel) through data lines.

The luminance compensation calculation formulas of the red, green, blue and white light emitting elements and the chromaticity compensation calculation formula of the white light emitting element are respectively as follows: O_LR=LR×GainR; O_LG=LG×GainG+LW×Color_GainG; O_LB=LB×GainB+LW×Color_GainB; O_LW=LW×GainW, where, GainR, GainG, GainB and GainW are luminance compensation gain values of the red light emitting element, the green light emitting element, the blue light emitting element and the white light emitting element, respectively; Color_GainG and Color_GainB are the chromaticity compensation gain values of the green and blue light emitting elements, respectively.

In some implementations, according to the chromaticity condition of the aged white light emitting element, light emitting elements with two other colors can be selected to compensating for the chromaticity of the white light emitting element, so as to finally ensure that the aged white light emitting element displays pure white after being compensated for the chromaticity thereof. For example, if the white light emitting element is bluish after aging, the chromaticity of the white light emitting element may be compensated by using the red light emitting element and the green light emitting element.

In some implementations, according to the chromaticity conditions of the aged light emitting elements with different colors, the light emitting elements with other colors may be selected to compensate the chromaticities of the aged light emitting elements, so as to finally ensure that the aged light emitting elements with different colors display relatively pure natural color after being compensated for the chromaticities thereof. The principle of compensating the chromaticities of the aged light emitting elements with different colors is the same as that of the white light emitting element, and is not described herein again.

The step S06 further includes: lighting the light emitting elements with other colors, which compensate for the chromaticity of the fourth light emitting element, in real time according to the real-time data signals of these light emitting elements with other colors, so that the fourth light emitting element can achieve the real-time target luminance and the real-time target chromaticity.

The real-time target luminance of the fourth light emitting element refers to a real-time luminance value (i.e., actual luminance, the unit of which is nit) of the fourth light emitting element before aging of the fourth light emitting element. The real-time target chromaticity of the fourth light emitting element refers to a real-time chromaticity value of the fourth light emitting element before aging of the fourth light emitting element.

In some implementations, the method for compensating for aging of the display panel may further include an electrical compensation solution and an optical compensation solution for compensating characteristics of a thin film transistor in a pixel driving circuit for driving the light emitting element, which are not described herein again.

In the embodiment of the present disclosure, the method for compensating for aging of the display panel is synchronously in real time with the display of the display panel. That is, the display of the display panel and the compensating for aging of the display panel are performed independently without mutual influence, and the method for compensating for aging of the display panel can realize direct compensation of the light emitting element without using an external detection circuit for compensation, and meanwhile, during compensating for aging of the display panel, the display time of the display panel cannot be occupied and no detection bright line is generated, it is further unnecessary for the efficiencies of the light emitting element to meet a one-to-one correspondence with the voltages across the anode and the cathode of the light emitting element. The method for compensating for aging of the display panel has high compensation accuracy and strong universality, achieving simple and efficient compensation for aging of the display panel.

Figure 10:
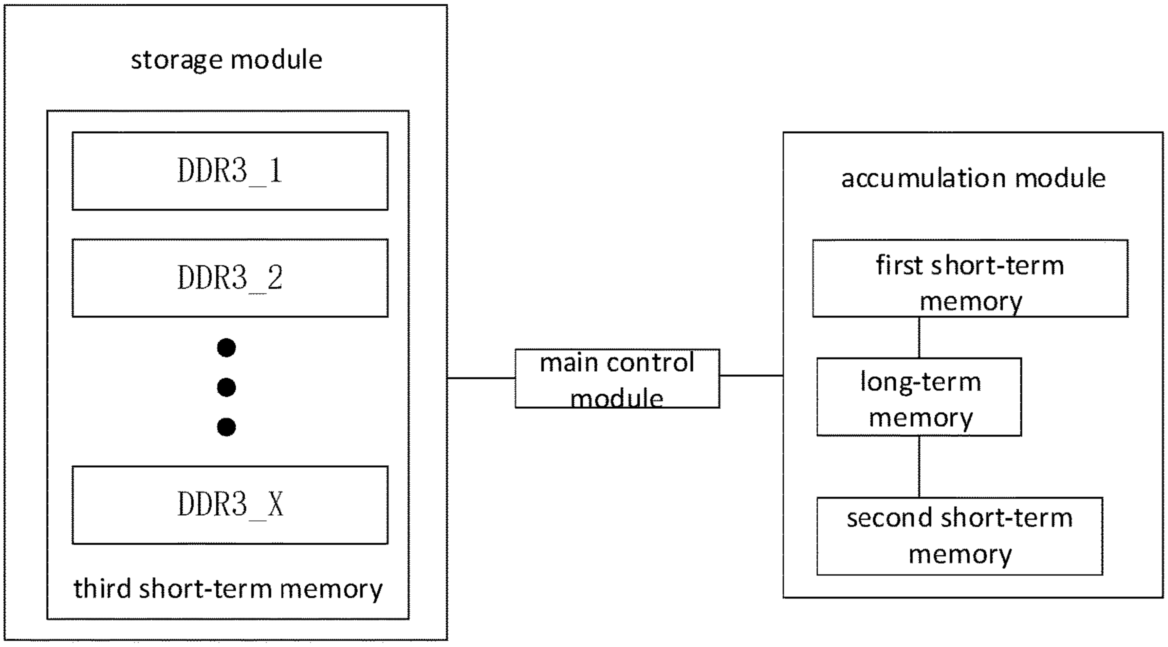
FIG. 10 is a schematic block diagram of a principle for compensating for aging of a display panel according to an embodiment of the present disclosure.

In a second aspect, an embodiment of the present disclosure further provides a display panel, FIG. 10 is a schematic block diagram shows a principle of compensating for aging of the display panel according to an embodiment of the present disclosure. Referring to FIG. 10, the display panel includes: a storage module configured to store a first mapping relationship table, the first mapping relationship table being a correspondence relationship table in which a mapping relationship between luminance accumulation amounts of each light emitting element in the display panel and luminance compensation gain values is recorded; a accumulation module configured to accumulate, when the display panel is powered on, luminance data of each light emitting element in real time to obtain real-time accumulation amount of the luminance data; a main control module configured to search, according to the real-time accumulation amount of the luminance data, a luminance compensation gain value corresponding to the real-time accumulation amount of the luminance data in the first mapping relationship table, calculate a real-time data signal for lighting the light emitting element according to the luminance compensation gain value corresponding to the real-time accumulation amount of the luminance data and a real-time target luminance value of the light emitting element, and light the light emitting element in real time according to the real-time data signal for lighting the light emitting element so that the light emitting element achieves a real-time target luminance.

In some implementations, the main control module may be an FPGA (Programmable Array logic); or may be an Application Specific Integrated Circuit (ASIC).

In some implementations, the memory module is provided on a timing controller board (i.e., Tcon board) in the display panel; the accumulation module is arranged in the main control module (i.e., FPGA or ASIC); the main control module is arranged on the timing controller board in the display panel.

In some implementations, the accumulation module includes a first short-term memory, which is configured to start to accumulate luminance data of the light emitting element in real time when the display panel is powered on. The main control module is configured to read and store a last accumulation result of the luminance data in the first short-term memory into a first cache when the first short-term memory accumulates the luminance data of the light emitting element each time, read the last accumulation result of the luminance data in the first cache, and add the last accumulation result of the luminance data to current luminance data of the light emitting element being lighted to obtain a current accumulation result for the luminance data, store the current accumulation result for the luminance data into a second cache, and store the current accumulation result for the luminance data in the second cache into the first short-term memory.

In some implementations, the first short-term memory is configured to accumulate the luminance data of the light emitting element from zero when the display panel is powered on.

In some implementations, the first short-term memory employs a double data rate (DDR) synchronous dynamic random access memory.

In some implementations, the accumulation module further includes a long-term memory, which is configured to start to accumulate the luminance data of the light emitting element in real time when the display panel is powered on. The main control module is configured to read and store the accumulation result of the luminance data in the first short-term memory into the first cache when the long-term memory accumulates the luminance data of the light emitting element each time, read the last accumulation result of the luminance data in the long-term memory and store it in the second cache, read and add the accumulation results of the luminance data in the first cache and the second cache, store the added accumulation result of the luminance data in a third cache, and store the added accumulation result of the luminance data in the third cache into the long-term memory.

In some implementations, the long-term memory is configured to accumulate the luminance data of the light emitting element based on the last accumulation result of the luminance data when the display panel is powered on.

In some implementations, the long-term memory employs an eMMC (Embedded Multi Media Card) with an MMC (multimedia Card) interface, a flash memory device, and a main controller.

In some implementations, the first short-term memory is configured to suspend accumulating the luminance data of each light emitting element while the long-term memory accumulates the luminance data of each light emitting element; or the display panel further includes a second short-term memory, which is configured to accumulate the luminance data of each light emitting element in real time from zero while the first short-term memory suspends accumulating the luminance data of each light emitting element.

In some implementations, the second short-term memory employs a double data rate (DDR) synchronous dynamic random access memory.

In some implementations, the memory module includes a third short-term memory. The main control module is configured to read a real-time accumulation amount of the luminance data of each light emitting element in the long-term memory and store the real-time accumulation amount of the luminance data into the third short-term memory, read the real-time accumulation amount of the luminance data of the light emitting element in the third short-term memory, and search, according to the real-time accumulation amount of the luminance data of the light emitting element, a luminance compensation gain value corresponding to the real-time accumulation amount of the luminance data in the first mapping relationship table; alternatively, read the real-time accumulation amount of the luminance data of the light emitting element in the long-term memory, and search, according to the real-time accumulation amount of the luminance data of the light emitting element, a luminance compensation gain value corresponding to the real-time accumulation amount of the luminance data in the first mapping relationship table, and store the luminance compensation gain value into the third short-term memory.

In some implementations, the third flash memory employs a double data rate (DDR) synchronous dynamic random access memory.

In some implementations, the long-term memory is configured to accumulate the luminance data of at least one row of light emitting elements each time.

In some implementations, the first short-term memory is configured to accumulate the luminance data of at least one row of light emitting elements each time; and the second short-term memory is configured to accumulate the luminance data of at least one row of light emitting elements each time.

In some implementations, the luminance data of each light emitting element accumulated each time and the actual luminance value of the light emitting element satisfy the following equation: $(L1/L2)^n = A1/A2$, where n ranges from 1.4 to 1.6, A1 and A2 represent luminance data of the light emitting element accumulated any two times, L1 represents the actual luminance value of the light emitting element corresponding to the luminance data A1, and L2 represents the actual luminance value of the light emitting element corresponding to the luminance data A2.

In some implementations, the main control module is configured to multiply the real-time target luminance value of the light emitting element by the luminance compensation gain value corresponding to the real-time accumulation amount of the luminance data to obtain a compensated luminance value, convert the compensated luminance value into a digital current signal for driving the light emitting element to emit light, convert the digital current signal into an analog voltage signal, where the analog voltage signal is a real-time data signal for lighting the light emitting element.

In some implementations, the light emitting elements include first light emitting element, a second light emitting element, a third light emitting element, and a fourth light emitting element with different colors. The storage module is further configured to store a second mapping relationship table; the second mapping relationship table is a corresponding relationship table in which a mapping relationship between the luminance accumulation amounts of the fourth light emitting element in the display panel and chromaticity compensation gain values is recorded; the accumulation module is further configured to accumulate the luminance data of the fourth light emitting element in real time when the display panel is powered up to obtain a real-time accumulation amount of the luminance data. The main control module is further configured to search, according to the real-time accumulation amount of the luminance data, a chromaticity compensation gain value corresponding to the real-time accumulation amount of the luminance data in the second mapping relationship table, calculate real-time data signal of a light emitting element with another color for compensating for the chromaticity of the fourth light emitting element according to the chromaticity compensation gain value corresponding to the real-time accumulation amount of the luminance data and the real-time target luminance value of the fourth light emitting element, and light the light emitting element with another color which compensates for the chromaticity of the fourth light emitting element in real time according to the real-time data signal of the light emitting element with another color, so that the fourth light emitting element achieves the real-time target luminance and the real-time target chromaticity.

In some implementations, the main control module is further configured to select, according to a change in chromaticity of the fourth light emitting element before and after aging of the fourth light emitting element, light emitting elements with two different colors from the first light emitting element, the second light emitting element and the third light emitting element for compensating chromaticity. The second mapping relationship table includes a first relationship table and a second relationship table. The first relationship table is a mapping relationship table in which a mapping relationship between the luminance accumulation amounts of the fourth light emitting element and first chromaticity compensation gain values of the light emitting elements with one of the two different colors is recorded. The second relationship table is a mapping relationship table in which a mapping relationship between the luminance accumulation amounts of the fourth light emitting element and second chromaticity compensation gain values of the light emitting element with the other of the two different colors is recorded. The main control module is further configured to add the compensated luminance value of the selected light emitting element of one of the two different colors and a product of the real-time target luminance value of the fourth light emitting element and a first chromaticity compensation gain value corresponding to the real-time accumulation amount of the luminance data to obtain a first luminance value for compensating chromaticity, add the compensated luminance value of the selected light emitting element of the other of the two different colors and a product of the real-time target luminance value of the fourth light emitting element and a second chromaticity compensation gain value corresponding to the real-time accumulation amount of the luminance data to obtain a second luminance value for compensating chromaticity, and respectively add the first luminance value for compensating chromaticity and the second luminance value for compensating chromaticity into the real-time data signals of the light emitting elements with the two different colors for compensating for the chromaticity of the fourth light emitting element.

In some implementations, the third short-term memory is further configured to store the chromaticity compensation gain values corresponding to the real-time accumulation amounts of the luminance data of the fourth light emitting element. One third short-term memory or a group of third short-term memories including a plurality of third short-term memories, such as DDR3_1, DDR3_2 . . . and DDR3_X may be provided.

In some implementations, the third short-term memory may further store electrical compensation data and optical compensation data for compensating for aging of the display panel.

In some implementations, the first light emitting element includes a red light emitting element; the second light emitting element includes a green light emitting element; the third light emitting element includes a blue light emitting element; the fourth light emitting element includes a white light emitting element.

In some implementations, a plurality of light emitting elements are provided and arranged in an array. The display panel further includes a detection and calculation module configured to obtain a first mapping relationship table through detection and calculation operations. The detection and calculation module includes: a first accumulation unit configured to light the light emitting elements for different time periods at a same luminance, and/or for a same time period at different luminances, and/or for different time periods at different luminances, respectively, different time periods respectively corresponding to different time points; and obtain the luminance accumulation amounts of each light emitting element at the different time points; a first calculation unit configured to calculate efficiencies of the respective light emitting elements at different time points based on the luminance accumulation amounts of the respective light emitting elements at different time points, and calculate the luminance compensation gain values of the respective light emitting elements at different time points according to the efficiencies of the respective light emitting elements at different time points; and a table creating unit configured to create the first mapping table in which the luminance accumulation amounts of the light emitting elements at different time points are in one-to-one correspondence with the luminance compensation gain values of the light emitting elements at different time points.

In some implementations, a plurality of the fourth light emitting elements are provided, and the detection and calculation module is further configured to obtain a second mapping relationship table through detection and calculation operations. The first accumulation unit is further configured to light the fourth light emitting elements in the display panel respectively for different time periods at a same luminance, and/or for a same time period at different luminances, and/or for different time periods at different luminances, different time periods respectively corresponding to different time points, and obtain the luminance accumulation amounts of the fourth light emitting elements at different time points. The first calculation unit is further configured to measure chromaticities of the fourth light emitting elements at different time points, calculate the chromaticity compensation gain values of the fourth light emitting elements at different time points according to the chromaticities of the fourth light emitting elements at different time points. The table creating unit is further configured to create the second mapping relationship table in which the luminance accumulation amounts of the fourth light emitting elements at different time points are in one-to-one correspondence with the chromaticity compensation gain values of the fourth light emitting elements at different time points.

In some implementations, the first accumulation unit is configured to extract and accumulate the luminance data of M rows of light emitting elements in each frame of continuous N frames of pictures, the M rows in one frame being different from the M rows in another frame, and the luminance data of all the light emitting elements are respectively accumulated once after the N frames of pictures are displayed, where, M×N is the number of rows of light emitting elements in the display panel; alternatively, the first accumulation unit is configured to accumulate the luminance data of each light emitting element frame by frame.

In some implementations, the first accumulation unit may be an electronic accumulation unit inside the display panel, such as a short-term memory, a long-term memory, or the like; or the luminance data may be accumulated by human. The first calculation unit may be a detection and calculation unit inside the display panel, for example, the detection unit may be a sensor, and the like, and the calculation unit may be a chip designed with a calculation formula therein, and the like; or the calculation may be performed by human. The table creating unit may be a chip capable of creating a table inside the display panel; or the table may be created manually.

In some implementations, the detection and calculation module may be only disposed in the display panel to be performed aging test thereon, so that the first mapping relationship table and the second mapping relationship table can be obtained through the display panel being performed aging test thereon, the first mapping relationship table and the second mapping relationship table obtained through the aging test are stored in a client display panel, and the client display panel directly uses the first mapping relationship table and the second mapping relationship table, so that the client display panel may not be provided with the detection and calculation module.

In some implementations, in a case that lighting currents of the light emitting element are the same before and after aging, the efficiency of each light emitting element at each of different time points=an actual luminance value of the light emitting element at a current time point/an initial actual luminance value of the light emitting element before aging; or, in a case that the lighting currents of the light emitting element are different before and after aging, the efficiency of each light emitting element at each of different time points=(the actual luminance value of the light emitting element at the current time point/the current lighting current of the light emitting element)/(the initial actual luminance value of the light emitting element before aging/an initial lighting current of the light emitting element before aging).

In some implementations, the luminance compensation gain value of the light emitting element at each of different time points=1/efficiency of the light emitting element at the each of different time points.

In the display panel provided in the embodiments of the present disclosure, display of the display panel can be synchronously with the compensating for aging of the display panel in real time, that is, the display of the display panel and the compensating for aging of the display panel are performed independently without mutual influence, and the method for compensating for aging of the display panel can realize direct compensation of the light emitting element without using an external detection circuit for compensation, and meanwhile, during compensating for aging of the display panel, the display time of the display panel cannot be occupied and no detection bright line is generated, it is further unnecessary for the efficiencies of the light emitting element to meet a one-to-one correspondence with the voltages across the anode and the cathode of the light emitting element. The method for compensating for aging of the display panel has high compensation accuracy, achieving simple and efficient compensation for aging of the display panel, and improving the display effect of the display device.

In a third aspect, an embodiment of the present disclosure further provides a display device, which includes the display panel in the foregoing embodiment.

With the display panel in the above-mentioned embodiment, accurate, simple, convenient and efficient compensation for ageing of the display device can be realized, and the display effect of the display device can be improved.

The display device may be any product or component with a display function, such as an OLED panel, an LED panel, a QLED panel, a Micro LED panel, a Mini LED panel, a television, a mobile phone, a tablet computer, a notebook computer, a display, a digital photo frame, a navigator and the like.

It will be understood that the above embodiments are merely exemplary embodiments employed to illustrate the principles of the present disclosure, and the present disclosure is not limited thereto. It will be apparent to those skilled in the art that various improvements and modifications can be made therein without departing from the spirit and essence of the present disclosure, and these improvements and modifications are to be considered within the scope of the present disclosure.

What is claimed is:

1. A display panel, comprising:

a storage module configured to store a first mapping relationship table, the first mapping relationship table being a correspondence relationship table in which a correspondence between luminance accumulation amounts and luminance compensation gain values of each of light emitting elements in the display panel is recorded;

an accumulation module configured to accumulate, in response to the display panel being powered on, luminance data of each light emitting element in real time to obtain a real-time accumulation amount of the luminance data; and a main control module configured to search, according to the real-time accumulation amount of the luminance data, a luminance compensation gain value corresponding to the real-time accumulation amount of the luminance data in the first mapping relationship table; calculate a real-time data signal for lighting each light emitting element according to the luminance compensation gain value corresponding to the real-time accumulation amount of the luminance data and a real-time target luminance value of the light emitting element; and light the light emitting element in real time according to the real-time data signal for lighting the light emitting element so as to enable the light emitting element to achieve the real-time target luminance.

2. The display panel of claim 1, wherein the accumulation module comprises a first short-term memory;

the first short-term memory is configured to start to accumulate, in response to the display panel being powered on, the luminance data of the light emitting element in real time; and the main control module is further configured to read and store a last accumulation result of the luminance data in the first short-term memory into a first cache in response to that the first short-term memory accumulates the luminance data of the light emitting element each time; read the last accumulation result of the luminance data in the first cache, and add the last accumulation result of the luminance data to current luminance data of the light emitting element lighted to obtain a current accumulation result of the luminance data; store the current accumulation result of the luminance data into a second cache; and store the current accumulation result of the luminance data in the second cache into the first short-term memory.

3. The display panel of claim 2, wherein the first short-term memory is configured to accumulate the luminance data of the light emitting element from zero in response to the display panel being powered on.

4. The display panel of claim 2, wherein the accumulation module further comprises a long-term memory;

the long-term memory is configured to start to accumulate the luminance data of the light emitting element in real time in response to the display panel being powered on; and the main control module is configured to read and store the accumulation result of the luminance data in the first short-term memory into the first cache every time the long-term memory accumulates the luminance data of the light emitting element; read and store the last accumulation result of the luminance data in the long-term memory into the second cache; read and add accumulation results of the luminance data in the first cache and the second cache, and store added accumulation result of the luminance data in a third cache; and store the added accumulation result of the luminance data in the third cache into the long-term memory.

5. The display panel of claim 4, wherein the long-term memory is configured to accumulate, in response to the display panel being powered on, the luminance data of the light emitting element based on the last accumulation result of the luminance data.

6. The display panel of claim 4, wherein the first short-term memory is configured to suspend accumulating the luminance data of the light emitting element in response to that the long-term memory accumulates the luminance data of the light emitting element; or the display panel further comprises a second short-term memory configured to accumulate the luminance data of the light emitting element in real time from zero in response to that the first short-term memory suspends accumulating the luminance data of the light emitting element.

7. The display panel of claim 6, wherein the storage module comprises a third short-term memory;

the main control module is configured to read a real-time accumulation amount of the luminance data of the light emitting element in the long-term memory and store the real-time accumulation amount of the luminance data of the light emitting element into the third short-term memory; read the real-time accumulation amount of the luminance data of the light emitting element in the third short-term memory, and search, according to the real-time accumulation amount of the luminance data of the light emitting element, a luminance compensation gain value corresponding to the real-time accumulation amount of the luminance data of the light emitting element in the first mapping relationship table; or the main control module is configured to read a real-time accumulation amount of the luminance data of the light emitting element in the long-term memory, and search, in the first mapping relationship table, according to the real-time accumulation amount of the luminance data of the light emitting element, a luminance compensation gain value corresponding to the real-time accumulation amount of the luminance data of the light emitting element, and store the luminance compensation gain value into the third short-term memory.

8. The display panel of claim 6, wherein the long-term memory is configured to accumulate the luminance data of the light emitting elements in at least one row each time, the first short-term memory is configured to accumulate the luminance data of the light emitting elements in at least one row each time, and the second short-term memory is configured to accumulate the luminance data of the light emitting elements in at least one row each time.

9. The display panel of claim 1, wherein the luminance data of the light emitting element accumulated each time and an actual luminance value of the light emitting element satisfy the following equation: $(L1/L2)^n = A1/A2$, wherein n ranges from 1.4 to 1.6, A1 and A2 represent the luminance data of the light emitting element accumulated any two times, L1 represents the actual luminance value of the light emitting element corresponding to the luminance data A1, and L2 represents the actual luminance value of the light emitting element corresponding to the luminance data A2.

10. The display panel of claim 1, wherein the main control module is configured to:

multiply the real-time target luminance value of the light emitting element by the luminance compensation gain value corresponding to the real-time accumulation amount of the luminance data to obtain a compensated luminance value;

convert the compensated luminance value into a digital current signal for driving the light emitting element to emit light; and convert the digital current signal to an analog voltage signal, the analog voltage signal being a real-time data signal for lighting the light emitting element.

11. The display panel of claim 1, wherein the light emitting elements comprise a first light emitting element, a second light emitting element, a third light emitting element, and a fourth light emitting element with different colors;

the storage module is further configured to store a second mapping relationship table, which is a correspondence table in which a correspondence between luminance accumulation amounts of the fourth light emitting element in the display panel and chromaticity compensation gain values is recorded;

the accumulation module is further configured to accumulate the luminance data of the fourth light emitting element in real time in response to that the display panel is powered on, so as to obtain the real-time accumulation amount of the luminance data; and the main control module is further configured to search, according to the real-time accumulation amount of the luminance data, in the second mapping relationship table, a chromaticity compensation gain value corresponding to the real-time accumulation amount of the luminance data; calculate a real-time data signal of a light emitting element with another color for compensating the chromaticity of the fourth light emitting element according to the chromaticity compensation gain value corresponding to the real-time accumulation amount of the luminance data and a real-time target luminance value of the fourth light emitting element; and light the light emitting element with another color for compensating the chromaticity of the fourth light emitting element in real time according to the real-time data signal of the light emitting element with another color, so as to enable the fourth light emitting element to achieve the real-time target luminance and a real-time target chromaticity.

12. The display panel according to claim 11, wherein the main control module is further configured to select light emitting elements of two different colors from the first light emitting element, the second light emitting element, and the third light emitting element for compensating the chromaticity according to a change in chromaticity before and after aging of the fourth light emitting element;

the second mapping relationship table comprises a first relationship table and a second relationship table;

the first relationship table is a mapping relationship table in which a mapping relationship between the luminance accumulation amounts of the fourth light emitting element and first chromaticity compensation gain values of the light emitting element with one of the two different colors is recorded;

the second relationship table is a mapping relationship table in which a mapping relationship between the luminance accumulation amounts of the fourth light emitting element and second chromaticity compensation gain values of the light emitting element with the other of the two different colors is recorded; and the main control module is further configured to add the compensated luminance value of the selected light emitting element with one of the two different colors and a product of the real-time target luminance value of the fourth light emitting element and the first chromaticity compensation gain value corresponding to the real-time accumulation amount of the luminance data to obtain a first luminance value for compensating chromaticity; and add the compensated luminance value of the selected light emitting element with the other of the two different colors and a product of the real-time target luminance value of the fourth light emitting element and a second chromaticity compensation gain value corresponding to the real-time accumulation amount of the luminance data to obtain a second luminance value for compensating chromaticity, and respectively add the first luminance value for compensating chromaticity and the second luminance value for compensating chromaticity into real-time data signals of the light emitting elements of the two different colors for compensating the chromaticity of the fourth light emitting element.

13. The display panel of claim 11, wherein the first light emitting element comprises a red light emitting element; the second light emitting element comprises a green light emitting element; the third light emitting element comprises a blue light emitting element; and the fourth light emitting element comprises a white light emitting element.

14. The display panel of claim 11, wherein a plurality of light emitting elements are provided, and the light emitting elements are arranged in an array; wherein the display panel further comprises a detection and calculation module configured to detect and calculate to obtain the first mapping relationship table; and the detection and calculation module comprises:

a first accumulation unit configured to light the light emitting elements for different time periods at a same luminance, and/or for a same time period at different luminances, and/or for different time periods at different luminances, respectively, the different time periods respectively corresponding to different time points to obtain the luminance accumulation amounts of each light emitting element at the different time points;

a first calculation unit configured to calculate efficiencies of each light emitting element at different time points based on the luminance accumulation amounts of the light emitting element at the different time points; and calculate the luminance compensation gain values of each light emitting element at different time points according to the efficiencies of each light emitting element at different time points; and a table creating unit configured to create the first mapping table in which the luminance accumulation amounts of each light emitting element at different time points are in one-to-one correspondence with the luminance compensation gain values of each light emitting element at different time points.

15. The display panel of claim 14, wherein a plurality of fourth light emitting elements are provided;

the detection and calculation module is further configured to detect and calculate to obtain the second mapping relationship table;

the first accumulation unit is further configured to respectively light the fourth light emitting elements in the display panel for different time periods at a same luminance, and/or for a same time period at different luminances, and/or for different time periods at different luminances, the different time periods respectively corresponding to different time points to obtain the luminance accumulation amounts of each fourth light emitting element at different time points;

the first calculation unit is further configured to measure chromaticities of each fourth light emitting element at different time points, and calculate the chromaticity compensation gain values of each fourth light emitting element at different time points according to the chromaticities of each fourth light emitting element at different time points; and the table creating unit is further configured to create the second mapping relationship table in which the luminance accumulation amounts of each fourth light emitting element at different time points are in a one-to-one correspondence with the chromaticity compensation gain values of each fourth light emitting element at different time points.

16. The display panel of claim 15, wherein the first accumulation unit is configured to extract and accumulate the luminance data of the light emitting elements in M rows of each frame of continuous N frames of pictures, the M rows in one frame being different from those in another frame, and the luminance data of each light emitting element is accumulated once after the N frames of pictures are displayed, wherein, M×N is a number of rows of light emitting elements in the display panel; or the first accumulation unit is configured to accumulate the luminance data of each light emitting element frame by frame.

17. The display panel of claim 14, wherein in response to that lighting currents of the light emitting element before and after aging are the same, the efficiency of each light emitting element at each of different time points=an actual luminance value of the light emitting element at a current time point/an initial actual luminance value of the light emitting element before aging; or in response to that the lighting currents of the light emitting element before and after aging are different, the efficiency of the light emitting element at each of different time points=(an actual luminance value of the light emitting element at a current time point/a current lighting current of the light emitting element)/(an initial actual luminance value of the light emitting element before aging/an initial lighting current of the light emitting element before aging); and wherein the luminance compensation gain value of each light emitting element at each of different time points=1/the efficiency of the light emitting element at the time point.

18. A display device, comprising the display panel of claim 1.

19. A method for compensating for aging of a display panel, comprising:

detecting and calculating to obtain a first mapping relationship table in which a mapping relationship between luminance accumulation amounts of each of light emitting elements in the display panel and the luminance compensation gain values of the light emitting element is recorded;

storing the first mapping relationship table into the display panel;

accumulating, in response to that the display panel is powered on, luminance data of each light emitting element in real time to obtain a real-time accumulation amount of the luminance data;

searching, according to the real-time accumulation amount of the luminance data, in the first mapping relationship table, a luminance compensation gain value corresponding to the real-time accumulation amount of the luminance data;

calculating a real-time data signal for lighting the light emitting element according to the luminance compensation gain value corresponding to the real-time accumulation amount of the luminance data and a real-time target luminance value of the light emitting element; and lighting the light emitting element in real time according to the real-time data signal for lighting the light emitting element so as to enable the light emitting element to achieve the real-time target luminance.

20. The method of claim 19, wherein the light emitting elements comprise a first light emitting element, a second light emitting element, a third light emitting element, and a fourth light emitting element which are different in color, and the method further comprising:

detecting and calculating to obtain a second mapping relationship table in which a mapping relationship between the luminance accumulation amounts of the fourth light emitting element in the display panel and chromaticity compensation gain values is recorded;

storing the second mapping relationship table into the display panel;

accumulating, in response to that the display panel is powered on, luminance data of the fourth light emitting element in real time to obtain a real-time accumulation amount of the luminance data;

searching, according to the real-time accumulation amount of the luminance data, in the second mapping relationship table, a chromaticity compensation gain value corresponding to the real-time accumulation amount of the luminance data;

calculating a real-time data signal of a light emitting element with another color for compensating for the chromaticity of the fourth light emitting element according to the chromaticity compensation gain value corresponding to the real-time accumulation amount of the luminance data and the real-time target luminance value of the fourth light emitting element; and lighting the light emitting element with another color for compensating for the chromaticity of the fourth light emitting element in real time according to the real-time data signal of the light emitting element with another color for compensating for the chromaticity of the fourth light emitting element, so as to enable the fourth light emitting element to achieve the real-time target luminance and a real-time target chromaticity.

* * * * *